(12) United States Patent
Hailey et al.

(10) Patent No.: US 7,533,400 B1
(45) Date of Patent: May 12, 2009

(54) SYSTEM FOR AUTOMATICALLY FORMING A PROGRAM GUIDE FROM INFORMATION DERIVED FROM MULTIPLE SOURCES

(75) Inventors: James Edwin Hailey, Indianapolis, IN (US); Michael Wayne Johnson, Indianapolis, IN (US); Hugh Boyd Morrison, Indianapolis, IN (US); Robert Joseph Logan, Indianapolis, IN (US); Robert Skipworth Comer, Carmel, IN (US); Sheila Renee Crosby, Crystal Lake, IL (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/402,517

(22) PCT Filed: Sep. 23, 1997

(86) PCT No.: PCT/US97/17037

§ 371 (c)(1),
(2), (4) Date: Oct. 5, 1999

(87) PCT Pub. No.: WO98/47287

PCT Pub. Date: Oct. 22, 1998

Related U.S. Application Data

(60) Provisional application No. 60/043,539, filed on Apr. 14, 1997.

(51) Int. Cl.
*H04N 5/445* (2006.01)
*H04N 7/16* (2006.01)
*G06F 13/00* (2006.01)
*G06F 3/00* (2006.01)

(52) U.S. Cl. ............................. 725/49; 725/59; 725/141; 725/153

(58) Field of Classification Search ................... 725/59, 725/141, 153
See application file for complete search history.

(56) References Cited

U.S. PATENT DOCUMENTS 5,448,568 A     9/1995   Delpuch et al.

(Continued)

FOREIGN PATENT DOCUMENTS

EP     0 723 369 A1     7/1996

(Continued)

OTHER PUBLICATIONS

B. Profit, "Intercast Brings the Web to TV", PC Magazine, Jan. 21, 1997, pp. 203-204.

(Continued)

*Primary Examiner*—Hunter B. Lonsberry
(74) *Attorney, Agent, or Firm*—Robert D. Shedd; Harvey D. Fried; Joel M. Fogelson

(57) ABSTRACT

A video decoder system automatically acquires program guide information from local and remote peripheral devices to form a composite program guide. Program guide information is received from a first source and access data is retrieved from memory. The access data is used to initiate communication automatically between the video decoder and a second source external to the video decoder. Program guide information retrieved from the second source together with program guide information provided by the first source is incorporated into a composite program guide for display. The communication may be initiated upon different conditions and a peripheral device and associated communication protocol may be identified from various sources of configuration information.

20 Claims, 9 Drawing Sheets

U.S. PATENT DOCUMENTS

| | | | | |
|---|---|---|---|---|
| 5,481,542 | A | | 1/1996 | Logston et al. ............ 370/94.2 |
| 5,544,161 | A | | 8/1996 | Bigham et al. |
| 5,548,532 | A | | 8/1996 | Menand et al. |
| 5,570,295 | A | | 10/1996 | Isenberg et al. |
| 5,583,864 | A | | 12/1996 | Lightfoot et al. ............ 370/396 |
| 5,589,892 | A | | 12/1996 | Knee et al. ................ 348/731 |
| 5,617,565 | A | | 4/1997 | Augenbraun et al. ........ 395/604 |
| 5,666,487 | A | | 9/1997 | Goodman et al. |
| 5,778,181 | A | | 7/1998 | Hidary et al. |
| 5,805,153 | A | | 9/1998 | Nielsen |
| 5,828,945 | A | | 10/1998 | Klosterman |
| 5,835,791 | A | * | 11/1998 | Goff et al. ..................... 710/62 |
| 5,883,677 | A | * | 3/1999 | Hofmann ................... 348/584 |
| 5,956,716 | A | | 9/1999 | Kenner et al. |
| 5,982,445 | A | | 11/1999 | Eyer et al. |
| 5,990,883 | A | * | 11/1999 | Byrne et al. ................ 345/721 |
| 5,991,799 | A | * | 11/1999 | Yen et al. ................... 709/218 |
| 5,991,832 | A | | 11/1999 | Sato et al. |
| 6,018,764 | A | | 1/2000 | Field et al. |
| 6,052,556 | A | * | 4/2000 | Sampsell ................... 725/133 |
| 6,075,568 | A | | 6/2000 | Matsuura |
| 6,173,317 | B1 | | 1/2001 | Chaddha et al. |
| 6,219,839 | B1 | * | 4/2001 | Sampsell ..................... 725/40 |
| 6,240,555 | B1 | | 5/2001 | Shoff et al. |
| 6,285,407 | B1 | | 9/2001 | Yasuki et al. |
| 6,418,556 | B1 | | 7/2002 | Bennington et al. |
| 6,426,779 | B1 | | 7/2002 | Noguchi et al. |
| 6,430,743 | B1 | | 8/2002 | Matsuura |
| 6,671,881 | B1 | * | 12/2003 | Tamer et al. .................. 725/31 |
| 6,788,709 | B1 | | 9/2004 | Hyakutake |
| 6,891,859 | B2 | | 5/2005 | Hyakutake |
| 2002/0138840 | A1 | | 9/2002 | Schein et al. |

FOREIGN PATENT DOCUMENTS

| | | |
|---|---|---|
| EP | 0 746 119 A2 | 12/1996 |
| EP | 0746119 | 12/1996 |
| EP | 0 811 939 A2 | 12/1997 |
| EP | 0 811 940 A2 | 12/1997 |
| EP | 0811939 | 12/1997 |
| EP | 0811940 | 12/1997 |
| JP | 6-208500 | 7/1994 |
| JP | 7-288606 | 10/1995 |
| JP | 8-046950 | 2/1996 |
| JP | 9-009160 | 1/1997 |
| JP | 9-065300 | 3/1997 |
| JP | 9-162818 | 6/1997 |
| JP | 10-032801 | 2/1998 |
| JP | 10-051751 | 2/1998 |
| JP | 10-126354 | 5/1998 |
| JP | 10-145687 | 5/1998 |
| JP | 10-150611 | 6/1998 |
| JP | 10-164529 | 6/1998 |
| JP | 10-174007 | 6/1998 |
| JP | 11-510978 | 9/1999 |
| JP | 2000-504134 | 4/2000 |
| WO | 95/33338 | 12/1995 |
| WO | WO 95/33338 | 12/1995 |
| WO | 96/26493 | 8/1996 |
| WO | WO 96/26493 | 8/1996 |
| WO | 96/33572 | 10/1996 |
| WO | 96/38002 | 11/1996 |
| WO | WO 96/38002 | 11/1996 |
| WO | 97/09827 | 3/1997 |
| WO | 97/11558 | 3/1997 |
| WO | WO 97/09827 | 3/1997 |
| WO | WO 97/11558 | 3/1997 |
| WO | 97/13368 | 4/1997 |
| WO | WO 97/13368 | 4/1997 |
| WO | 97/28499 | 8/1997 |
| WO | WO 97/28499 | 8/1997 |
| WO | 97/41690 | 11/1997 |
| WO | WO 97/41690 | 11/1997 |
| WO | WO 97/43855 | 11/1997 |

OTHER PUBLICATIONS

B. Profit, "Intercast Brings The Web To TV", PC Magazine, Jan. 21, 1997, pp. 203-204.

"ITU-T - Telecommunication Standardization Sector of ITU, Jul. 1995 - Transmission of Non-Telephone Signals - Information Technology - Generic Coding of Moving Pictures and Associated Audio Information: Systems", pp. 8-31 & pp. 104-109.

"Joining Television and the Internet Using Java", InternetWeek, Apr. 1, 1996, vol. 2, No. 14, Phillips Business Information, Inc., Potomac, Maryland , pp. 1-3.

Matsubara Atsushi, "Media of Next Generation Change the Households, Part 4", Chinese Version, Nikkei Byte, Oct. 22, 1996, No. 157, pp. 162-165 (pp. 1-11).

Ishii Tomoaki, "Personal Computer and TV Merge With Internet in the Centre: New Services that Promote the Realization of Multimedia Continue to Appear", Nikkei Personal Computing, Mar. 25, 1996, No. 261, pp. 218-223 (pp. 1-10).

Kamada Tomiku, "Period When Over One Hundred Million People All Networked! One Can Use Internet Even He or She Has No Personal Computer", Computer and Network LAN, Apr. 1, 1996, pp. 86-92 (pp. 1-16).

Toru Arakawa, "The Internet Home Electronics and the Information Network Revolution", IEICE Technical Report, May 23, 1996, vol. 96, No. 70, pp. 1-6 (pp. 1-17).

Matsubara Atsushi, "Media of Next Generation Change the Households, Part 1", Nikkei Byte, Oct. 22, 1996, No. 157, pp. 140-143 (pp. 1-11).

Matsubara Atsushi, "Media of Next Generation Change the Households, Part 2", Nikkei Byte, Oct. 22, 1996, No. 157, pp. 144-153 (pp. 1-29).

Matsuhara Atsushi, "Coming Media Changes Home Places", Nikkei Byte, Oct. 22, 1996, No. 157, pp. 154-161 (pp. 1-24).

Miwa Yoshihisa, "Conditions for Internet Computers", Nikkei Byte, Nov. 22, 1996, No. 157, pp. 216-225 (pp. 1-32).

Gota Hiroshige, "NC Shock! No. 5 Network Computer Shock", ASC II No. 20 card, No. 12, Dec. 1, 1996, pp. 454-459 (pp. 1-27).

"Network Computer Forefront Met the Second Stage of Complete Selection of Materialo of a New Tendency of Microsoft, Sun, and Oracle", DOS/V Power Report, 7th Publishing, Jan. 1, 1997, pp. 131-142 (pp. 1-38).

Shigeo Otsu, et al., "Signal Transmission Performance of a Multimedia Satellite Communications System", Nov. 1996, The Institute of Electronics Information and Communication Engineers, Technical Report of IEICE, pp. 73-78 (pp. 1-16).

N. Ishikawa, et al., "Wide Bandwidth WAN and Service", Nikkei Communications, vol. 239, Feb. 3, 1997, pp. 112-113 (pp. 1-8).

Akihiro Okada, et al., "Satellite Communication Service DirecPC Application Systems", Fujitsu Corp., Oct. 3, 1997, pp. 1-8 (pp. 1-21).

A. Matsubara, "Start of Diverse Services Associated with Digital Broadcasting", Nikkei Byte, vol. 157, Oct. 22, 1996, pp. 1-8 (pp. 1-21).

M. Nishida, "Data Falls Down From The Sky", Asahi Personal Computer/The Asahi Shimbun Company Issue 190, Feb. 1, 1997, pp. 1-4 (pp. 1-11).

http://webopedia.com/TERM/s/streaming.html. Jupiter Media, "Streaming", Webopedia, Mar. 28, 2002, pp. 1-3.

"Electronic Program Guide Via Internet", Research Disclosure Bulletin, No. 38502, May 1996, p. 276.

ETSI Technical Report, "Digital Broadcasting Systems for Television; Implementation Guidelines for the Use of MPEG-2 Systems; Guidelines on Implementation and Usage of Service Information", Apr. 1996, pp. 27-30 (pp. 1-7).

\* cited by examiner

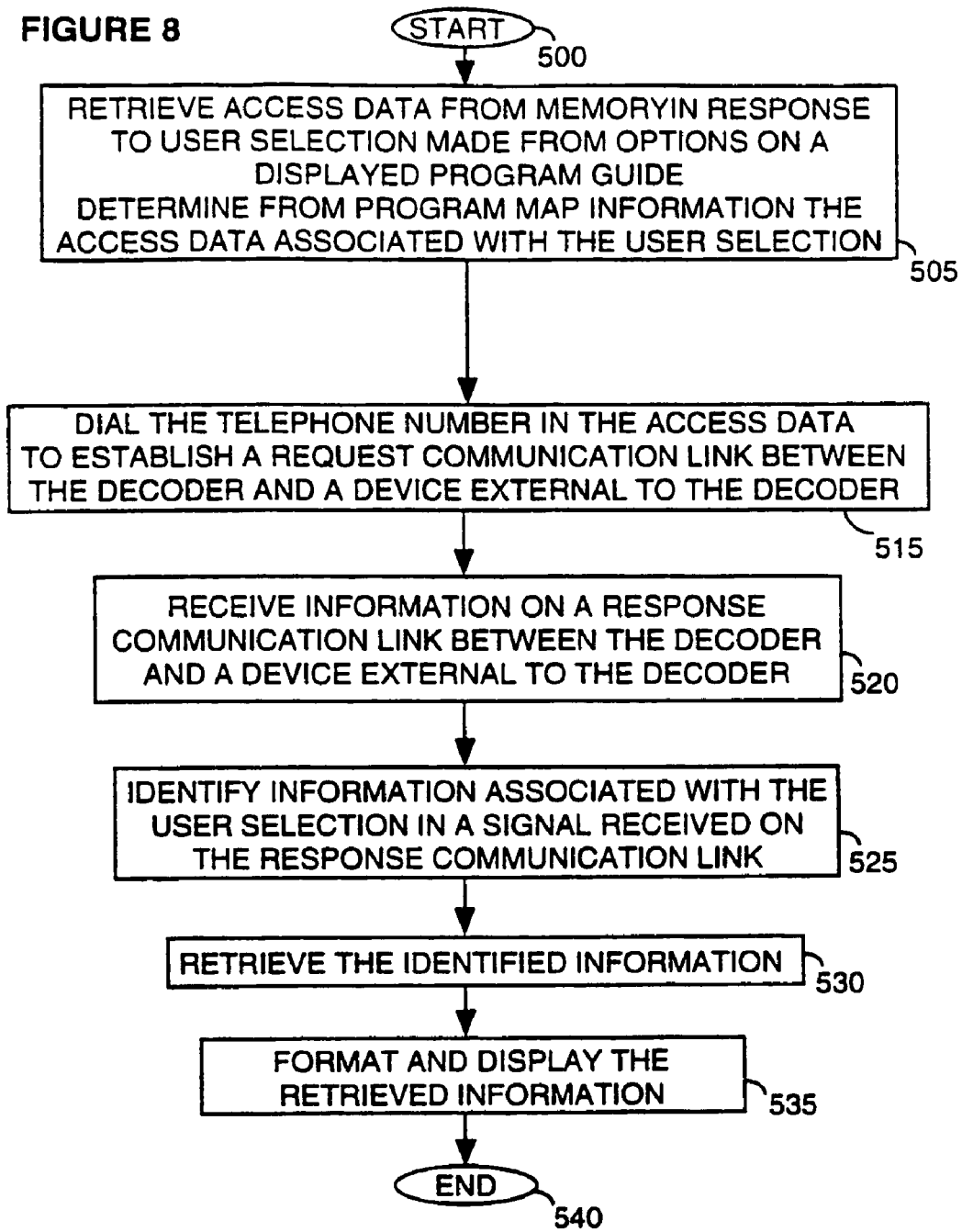

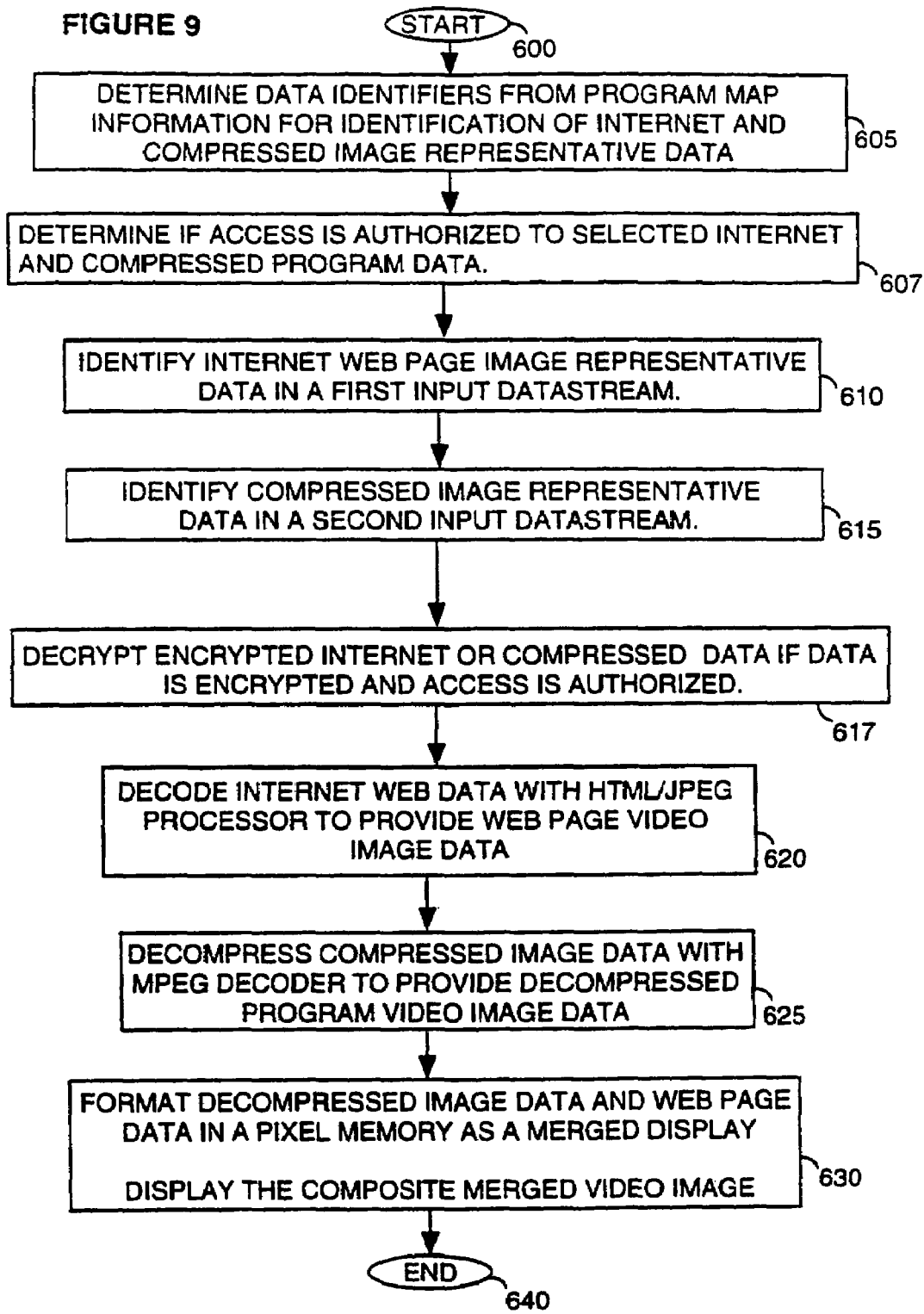

SYSTEM FOR AUTOMATICALLY FORMING A PROGRAM GUIDE FROM INFORMATION DERIVED FROM MULTIPLE SOURCES

This is a non-provisional application of provisional application Ser. No. 60/043,539 by R. J. Logan et al, filed 14 Apr. 1997.

FIELD OF THE INVENTION

This invention is related to the field of digital signal processing, and more particularly to the acquisition, formation and processing of Program Guide Information, and program content data, derived from multiple sources, e.g. Internet, cable, satellite and terrestrial sources.

BACKGROUND OF THE INVENTION

Home entertainment systems which combine Personal Computer and television functions (PC/TV systems), are increasingly becoming, generic, User interactive, multiple source and multiple destination communication devices. Such systems are required to communicate in different data formats between multiple locations for a variety of applications in response to User requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g. the Internet) and coaxial lines (e.g. cable TV) and from both remote and local sources such as Digital Video Disk (DVD), CDROM, VHS and Digital VHS (DVHS™) type players, PCs, and many other types of sources.

A number of problems arise in developing such a generic PC/TV entertainment system. Specifically, problems arise in supporting communication between multiple data sources and in processing data from the multiple sources. A problem is also presented by the need to devise a User interface for such a system that supports complex User interactive tasks whilst providing a simple command interface suitable for the general public. A PC/TV system User interface, for example, should allow a User to view a selected program and permit User operation of functions such as Email, telephone, Internet access, fax and video-phone functions. Such applications require communication between a PC/TV unit and a variety of both remote sources e.g. a satellite service provider, and local sources e.g. a DVD storage device. Further, a PC/TV needs to process and decode data in different data formats from different devices and display received data to the User. These problems are addressed by a system according to the present invention.

Prior art references include WO97/13368 which discloses a program guide processing system involving acquisition of program guide information from Internet sources in response to a user command associated with program or service selection and search operations. Further, the prior art references also include U.S. Pat. No. 5,589,892 which discloses a program guide processing system involving download of program guide application software. In addition, the prior art references include the article "Intercast Brings the Web to TV", Jan. 21, 1997 PC magazine, which discloses a system for conveying a program guide in the Vertical Blanking Interval of an analogue TV signal.

SUMMARY OF THE INVENTION

The inventors have hereby recognized that a Program Guide type of User interface advantageously provides a simple, easy to use interface for User operation of functions such as Email, telephone, Internet access, fax, home control, and video-phone functions. The use of a Program Guide for such functions also advantageously provides a single User interface for User operation of multiple devices and associated functions.

The inventors have further recognized that it is desirable for a video decoder system to be capable of automatically acquiring program guide information from local and remote peripheral devices to form a composite program guide. A video decoder automatically acquires program guide information describing the program content available from peripheral devices such as a DVD device or server. The composite program guide includes communication protocols and access data involved in data transfer between a PC/TV unit and a variety of both local and remote peripheral devices, for example.

In a method for forming a composite program guide from information available from a plurality of sources, program guide information is received from a first source. Access data is retrieved from memory and used to initiate communication automatically between the decoder and a second source external to the video decoder. Program guide information retrieved from the second source together with program guide information provided by the first source is incorporated into a composite program guide for display.

In a feature of the invention, communication is initiated upon one of the following conditions: i) power-up of the decoder, ii) power-up of the attached peripheral device, iii) repetitive pre-programmed command from a decoder processor, iv) change in number of attached peripheral devices, and v) change in type of attached peripheral devices.

In another feature of the invention, a peripheral device and associated communication protocol is identified from configuration information derived from one of: a) pre-stored data in internal memory of the decoder, b) data entered by a User, and c) the program guide information received from the first source.

BRIEF DESCRIPTION OF THE DRAWINGS

In the drawing:

FIG. 8 shows a flowchart, according to the invention, for a process to acquire information requested by a video receiver User via a selection made from options on a displayed program guide.

FIG. 9 shows a flowchart, according to the invention, for a process to decode input Internet information and compressed video data and to form a composite video output for display.

DETAILED DESCRIPTION OF THE DRAWINGS

Figure 1:
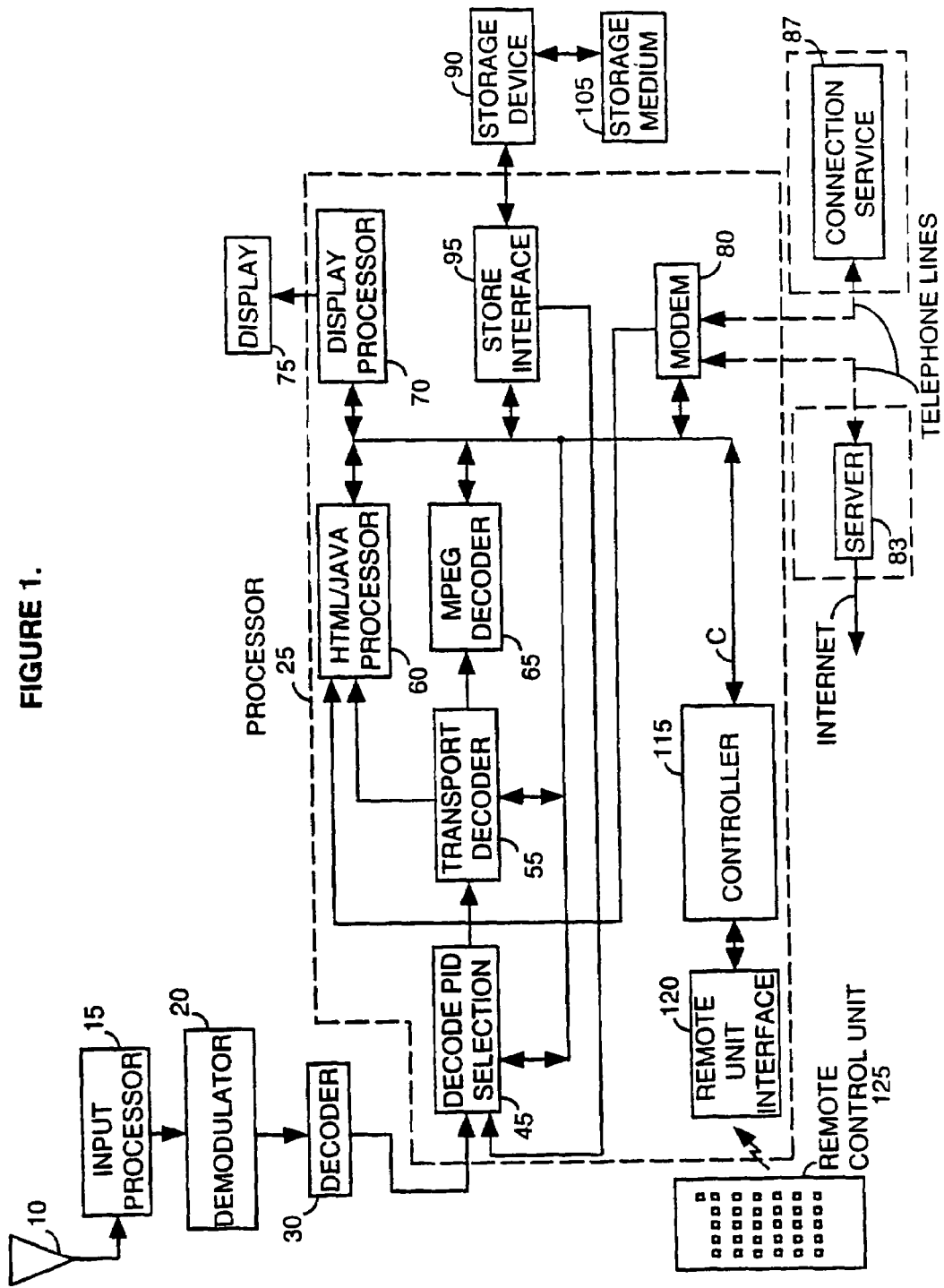
FIG. 1 shows a home entertainment decoder system, according to the invention, for communicating with a plurality of sources and for processing program guide information and program content data.

FIG. 1 shows a home entertainment decoder system, according to the invention, for communicating with multiple sources to acquire program guide information and program content data. The decoder system forms a program guide for display from information acquired and collated automatically from multiple sources. A User may initiate Email, telephone, Internet access, fax and video-phone functions via selection of options from the displayed program guide. The decoder system adaptively decodes a datastream encoded to the MPEG standard incorporating compressed program content data and Internet data representative of, for example, Hypertext Mark-up Language (HTML). The decoded data is formatted either as a composite video image or as separate video images for display.

The MPEG2 (Moving Pictures Expert Group) image encoding standard, hereinafter referred to as the "MPEG standard" is comprised of a system encoding section (ISO/IEC 13818-1, 10 Jun. 1994) and a video encoding section (ISO/IEC 13818-2, 20 Jan. 1995), hereinafter referred to as the "MPEG systems standard" and "MPEG video standard" respectively.

Although the disclosed system is described in the context of a system for receiving an MPEG compatible signal, it is exemplary only. The principles of the invention may be applied to systems in which the types of transmission channels and communication protocols may vary, or to systems in which the coding type may vary. Such systems may include, for example, non-MPEG compatible systems, involving other types of encoded datastreams and other methods of conveying Program Guide information. Further, although the disclosed system is described as processing broadcast programs, this is exemplary only. The term 'program' is used to represent any form of data such as telephone messages, computer programs, Internet data or other communications, for example.

In overview, in the video receiver system of FIG. 1, a carrier modulated with video data is received from a broadcast satellite by antenna 10 and processed by unit 15. The resultant digital output signal is demodulated by demodulator 20 and decoded and error corrected by decoder 30. In this exemplary embodiment, the demodulated and decoded output from unit 30 is in the form of an MPEG compatible transport stream containing MPEG compressed video data and Internet data encoded in HTML. Video data encoded to the MPEG standard is in the form of a packetized datastream which typically includes the data content of many program channels (e.g. content corresponding to cable television channels 1-125).

The MPEG compatible transport stream is provided to processor 25 which is responsive to commands from remote control unit 125. Processor 25 communicates with other data sources including storage device 90 and either Internet data server 83 or Internet connection service 87 (e.g. America On-line™). Program guide information is acquired and collated automatically from the input transport stream and storage device 90 and either server 83 or connection service 87. The acquired information is merged by processor 25 to form a program guide for display incorporating selection options allowing a User to initiate Email, telephone, Internet access, fax and video-phone functions among others, for example. The program guide for display is also formed to include non-displayed information from multiple sources for identifying and assembling individual data packets that constitute the programs that are selected for User viewing or listening. This information is used in recovering the content of selected programs from multiple sources.

Processor 25 adaptively decompresses the input compressed video data and decodes the HTML Internet data to provide a formatted composite video image for display on unit 75. Processor 25 also provides encoded data outputs for storage on storage medium 105 via storage device 90, and provides encoded data to other devices (not shown to simplify drawing) via modem 80 and telephone lines.

A video receiver user initiates functions including Email, telephone, Internet access, fax and video-phone functions and viewing and storage of selected programs via selection of options from the displayed program guide. A User selects a displayed option with a cursor using remote control unit 125. Commands from remote control 125 are passed via interface 120 to controller 115 within processor 25. Unit 115 controls the operation of the elements of processor 25 and responds to remote control unit 125 commands using a bi-directional data and control signal bus C. Controller 115 controls the functions of individual elements within processor 25 by setting control register values within these elements with control bus C. Processor 25 also supports the storage and retrieval of data from storage medium 105 via storage device 90. Storage device 90 is a DVD type device and medium 105 comprises a multi-disk stack unit containing a plurality of disks in this exemplary embodiment.

Considering FIG. 1 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band. Processor 15 also includes an analog to digital converter for digitizing the down-converted signal to produce a signal suitable for further processing. The resultant digital output signal is demodulated by demodulator 20 and decoded and error-corrected by decoder 30. The output from decoder 30 is further processed by unit 45 of processor 25.

The data provided to unit 45 is in the form of an MPEG compliant packetized transport datastream as defined in MPEG systems standard section 2.4 and includes program guide information and the data content of one or more program channels. Processor 25 acquires and collates program guide information automatically from the input transport stream and storage device 90 and either Internet data server 83 or Internet connection service 87 (e.g. America On-line™). The individual packets that comprise either particular program channel content, or Program Guide information, are identified by their Packet Identifiers (PIDs) contained within header information.

In response to control signal C, unit 45 selects either the transport stream from unit 30, or in a playback mode, a datastream retrieved from storage device 90 via store interface 95. In normal, non-playback operation, individual packets that comprise program guide information are identified by unit 45 in the transport stream from unit 30 and assembled using PIDs that are predetermined and stored in internal memory of controller 115. Unit 45 matches the PIDs of incoming packets in the transport datastream from decoder 30 with PID values pre-loaded in control registers within unit 45 by controller 115. Therefore, satellite broadcast program guide (SPG) information packets in the transport stream are identified by unit 45 without additional PID information. Controller 115 acquires a full SPG by accessing and assembling the SPG packets that are identified and captured by unit 45.

The PID information that enables controller 115, in conjunction with unit 45, to identify data packets that comprise individual programs is termed a program or channel map. The program map associates PIDs with individual packetized datastreams that constitute a program and is part of the SPG. The SPG may also contain additional information, e.g. packet assembly information, supporting the recovery of program guide data from the input transport stream.

Controller 115 also configures unit 45 using Control signal C to select the data packets comprising the DVD program guide (DPG) information derived from DVD storage device 90 via interface 95. Unit 45 matches the PIDs of incoming packets in the packet datastream from interface 95 with PID values pre-loaded in control registers within unit 45 by controller 115. Controller 115 acquires a full DPG by accessing and assembling the DPG packets that are identified and captured by unit 45.

A similar process is followed in acquiring Internet program guide (IPG) information from Internet server 83 or from Internet connection service 87 by telephone line communication via modem 80. In acquiring the IPG, data identifiers analogous to or the same as the PIDs used in acquiring the SPG or DPG are matched with identifiers pre-loaded by controller 115. The matching function may be performed either within unit 80 or by controller 115. The process for acquiring program guide information is explained in greater detail in the description of FIGS. 4-6.

The SPG, DPG and IPG information acquired by controller 115 is merged by processor 25 to form a program guide for display incorporating selection options allowing a User to initiate Email, telephone, Internet access, fax and videophone functions. In merging the data, the acquired SPG, DPG and IPG information is collated into two levels of hierarchy termed theme and topic and redundant program guide information is eliminated. A theme, for example, may include categories such as movies, sports, weather, arts, documentaries, news, etc. A topic is a category within a theme, for example, a movie theme category may have topics including, comedy, thriller, horror, science fiction, romance, adult entertainment, etc. Different or additional levels of hierarchy may be used in collating the acquired SPG, DPG and IPG information involving criteria such as viewer age suitability, the period setting e.g. contemporary or historical, reviewer ratings etc.

A number of problems occur in collating the SPG, DPG and IPG information. The SPG, DPG and IPG information, being from different sources, may categorize programs by different themes and topics and may use a different sorting hierarchy. Further, the SPG, DPG and IPG data may use conflicting, redundant or incompatible PIDs or other data identifiers for identifying individual data elements that comprise particular program channel or guide content. Controller 115 creates a master set of themes and topics mapping the SPG, DPG and IPG information to a corresponding category in the master set. For example, the master set may contain an encompassing topic-theme of 'movies-comedy' to which is mapped both, a) the DPG topic-theme of 'movie-parodies', and b) the IPG Internet topic-theme of 'movie-synopsis index' (an index of web pages). In collating the guide information, controller 115 determines the topic and theme categories of the data in the SPG, DPG and IPG from predetermined theme-topic codes. The SPG, DPG and IPG theme and topic codes together with equivalence mapping information for converting codes of one service provider, to those of another, are acquired from the SPG or User defined data input to processor 25 or are pre-stored in internal memory within controller 115. Controller 115 assembles the collated SPG, DPG and IPG packets according to the categories defined by the master set of themes and topics. The assembled collated SPG, DPG and IPG data is stored by controller 115 in internal memory for use in forming a composite program guide for display.

Controller 115 also forms MPEG compatible non-displayed information, associated with the displayed composite program guide. The non-displayed information includes composite program map, conditional access and network information. This non-displayed information is required to support identification, assembly and decoding of the packets comprising the composite program guide and the associated program content. The conditional access information governs access to programs based upon User entitlement. The network information defines physical network parameters such as satellite transmission channel frequencies and transponder channels, for example.

Controller 115 forms composite program map information for the composite program guide that maps the SPG, DPG and IPG themes and topics to the master set of themes and topics. The composite program map also associates data identifiers (e.g. PID values) with individual packetized datastreams that constitute programs listed in the composite program guide. The composite program map information may also include a dedicated indicator to denote that a particular program has associated Internet web page information available. In forming composite program map information, controller 115 examines the SPG, DPG and IPG information for data identifier omissions, redundancies and conflicts. Controller 115 re-numbers existing data identifiers and creates new data identifiers as required to produce MPEG compatible program map information for both the collated program guide information and the associated program content.

Controller 115 also forms MPEG compatible conditional access information and network information from corresponding information received in the SPG, DPG and IPG data. The conditional access information includes data such as encryption codes that govern access to programs that are dependent upon user entitlement. The network information defines physical network parameters such as satellite transmission channel frequencies, transponder channels, and Internet access parameters associated with the composite program guide for display. The composite program map, conditional access and network information supports assembly, decoding and display of the program content available from the satellite, storage and Internet server sources as well as the composite program guide.

Controller 115 also includes additional linking data in the non-displayed composite program map, conditional access and network information. The additional linking data supports the User selectable functions such as Email, telephone, Internet access, fax, video-phone, channel tuning, program recording and home control functions. Home control functions may support User control of lighting air conditioning, heating and burglar alarm operation, for example. The additional linking data associates access data, both with data identifiers (e.g. PIDs) of requested data, and with User selectable menu options in the displayed composite program guide. The access data includes identification codes, communication protocol codes, conditional access codes, Internet access codes e.g. URL codes for web page and Email access as well as telephone and fax numbers. The access data enables processor 25 to communicate with external devices.

In order to generate the composite program guide for display, controller 115 retrieves the assembled and collated SPG, DPG and IPG packet data previously stored in internal memory. Controller 115 both converts the retrieved data to pixel data and formats the converted data for storage in a pixel representative memory map contained in display processor 70. In addition, controller 115 creates User selectable menu options (for User selection of Email, fax etc.) in pixel data form for incorporation in the unit 70 pixel memory map. Controller 115 stores the formatted SPG, DPG and IPG pixel data together with the generated option pixel data in the unit 70 pixel map to form the composite program guide for display.

The composite program guide, combining the SPG, DPG and IPG data and User selectable options, is formatted to be compatible with the linking data in the non-displayed program guide information. For example, a User selectable option in the displayed guide (e.g. for a telephone function) is associated, both with access data for the function (e.g. a telephone number), and with data identifiers (e.g. PIDs for data packets of transmitted and received telephone messages).

Display processor 70 converts the stored and formatted program guide data into conventional luminance and chrominance components. The luminance and chrominance components, together with timing data provided by controller 115, are processed by processor 70 in a conventional manner to form an NTSC signal for display on NTSC compatible image reproduction device 75 e.g. a television or video monitor. Processor 70 may, in another embodiment, provide RGB output data for display by an RGB compatible reproduction device or a high definition television.

Controller 115, in conjunction with processor 55, forms an MPEG compatible datastream of compressed video and audio data containing the composite program guide and program content. Processor 55 separates system information including timing, error and synchronization information from the datastream from unit 45 and diverts it for use by controller 115. Controller 115 applies the system information in controlling processor 55 to provide re-synchronized, collated program and composite program guide data together with synchronization and error indication information for use in subsequent program content data decompression by decoder 65. The composite program guide data provided by processor 55 combines the SPG, DPG and IPG data and User selectable options in a manner compatible with the program map linking information as previously described. The program content data provided by processor 55 is decompressed by MPEG decoder 65 to provide video pixel data and audio output data to processor 70. Display processor 70 processes the video pixel data and audio output data to be suitable for reproduction by unit 75 as previously described.

Figure 2:
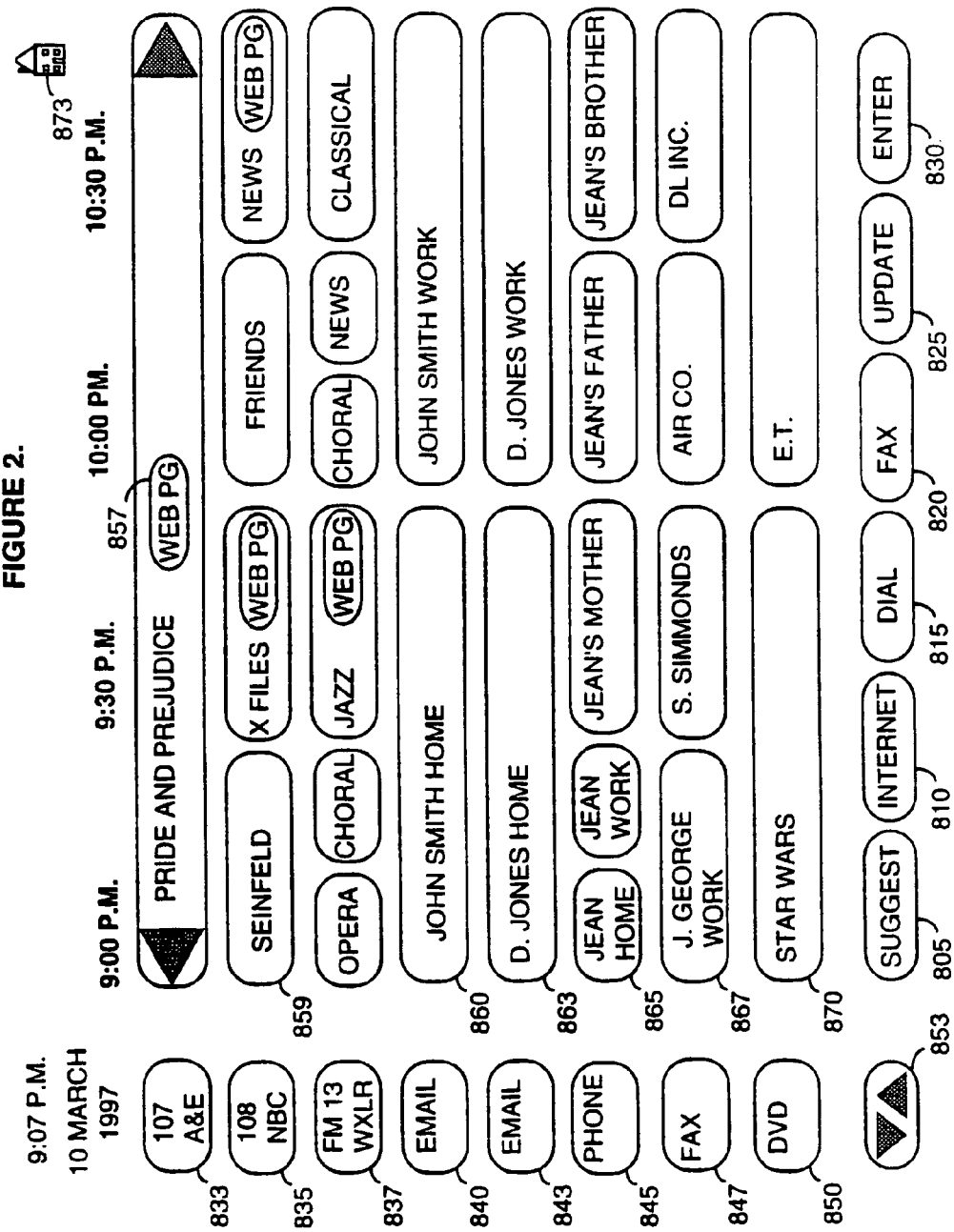
FIG. 2 shows an exemplary Program Guide display format according to the invention.

FIG. 2 shows an exemplary displayed composite program guide. Menu features 833-850 show program services and functions. Menu features 833 and 835 show program channels which may be invoked and displayed upon highlighting of the corresponding menu feature using a User selection control such as a remote control directed cursor. If a User highlights feature 833 with the cursor, i.e. selects menu option 833, for example, processor 25 tunes to television channel 107 (A&E™) and displays it on unit 75 using the composite non-displayed program guide information to determine the function activated and associated tuning information (channel frequencies etc.). Similarly, if a User highlights feature 837, processor 25 tunes to receive radio channel FM 13 for audio output on unit 75. Upon highlighting features 840-850, corresponding to Email, telephone, fax and DVD record/playback functions respectively, additional function specific menus become displayed providing further User selection options. Such function specific menus may provide a User with the ability to edit, store and delete access information including, for example, telephone numbers, Email addresses, Internet addresses, credit card numbers and additional conditional access data.

If a User highlights menu features 860-870 specific function tasks are initiated. Upon a User highlighting feature 860, for example, a further menu is displayed prompting the User to enter an Email message to be sent to John Smith at his home via an Internet Email address retrieved from the composite non-displayed program guide information. Similarly, in response to a User highlighting feature 865, for example, controller 115 (FIG. 1) retrieves Jean's home telephone number from internal memory using the composite non-displayed program guide information. Further, controller 115 establishes telephone communication, via modem 80, with Jean at her home by dialing Jean's home telephone number. Also, upon a User highlighting feature 870, for example, the movie 'Star Wars™' is re-played from DVD unit 90 (FIG. 1). The communication between processor 25 and DVD unit 90 is established with access data retrieved from memory within controller 115 using the composite non-displayed program guide information.

In addition, the program guide may include one or more icons, such as icon 873 (FIG. 2) depicting a home, for example, to indicate whether Internet information such as a 'home page' is available for a particular program. Further, icon 873, in FIG. 2 may change color e.g. from white to green to indicate Internet information is available for a particular program. Alternatively, icon 873 may be a pop-up icon which appears as an indication that Internet information is available for a particular program. The displayed program guide may be formed to enable a User to request Internet information on a particular program by highlighting the program followed by highlighting the pop-up icon, for example. Home page icons that are present when Internet information is available may also located within or adjacent to program icons, e.g. icon 859. Further, the home page icon may change color upon User selection of the information by highlighting the home page icon.

Although Internet information may be retrieved upon highlighting a web page icon such as icon 857, in FIG. 2, this is exemplary only. Retrieval of Internet information may also be initiated in a variety of other ways. A user may retrieve available Internet information relating to a program, by highlighting a program icon such as 'Seinfeld™' using icon 859 followed by highlighting Internet icon 810, for example.

Upon User selection of a composite program guide function, controller 115 (FIG. 1) determines and applies the access data associated with both request and response operations involved in the selected function. Controller 115 determines the access data required for the request and response operations from the previously formed non-displayed composite program map, conditional access and network information.

Processor 25 acquires information, such as web page data, in response to a User request, in a number of ways, including, for example:

a) In a first configuration, processor 25 accesses web page data that is continuously transmitted in the satellite broadcast received from decoder 30, b) In a second configuration, processor 25 acquires web page data that is transmitted in the satellite broadcast received from decoder 30 in response to an information request to a service provider via telephone line, and c) In a third configuration, processor 25 both requests information and receives response information on the same communication link e.g. on the telephone link to server 83.

First configuration of Processor 25

In the first configuration, web page data selected by a User via the displayed program guide is continuously transmitted within the transport datastream input to processor 25 from decoder 30. In this configuration, the composite program map information contains predetermined PID values for the requested web page. Consequently, the requested web page data is retrieved from the input transport stream using the composite program map information without the need for controller 115 to communicate with a service provider via modem 80. In this configuration, the web information available to a User is limited to the specific information that a service provider continuously transmits to processor 25 using dedicated transmission bandwidth. However, this configuration is simple and offers quick web page access (since the web data may be stored locally at the encoder by the service provider). This configuration also minimizes the service provider burden of data acquisition and eliminates the need for processor 25 to communicate web page request information to a service provider.

Figure 3:
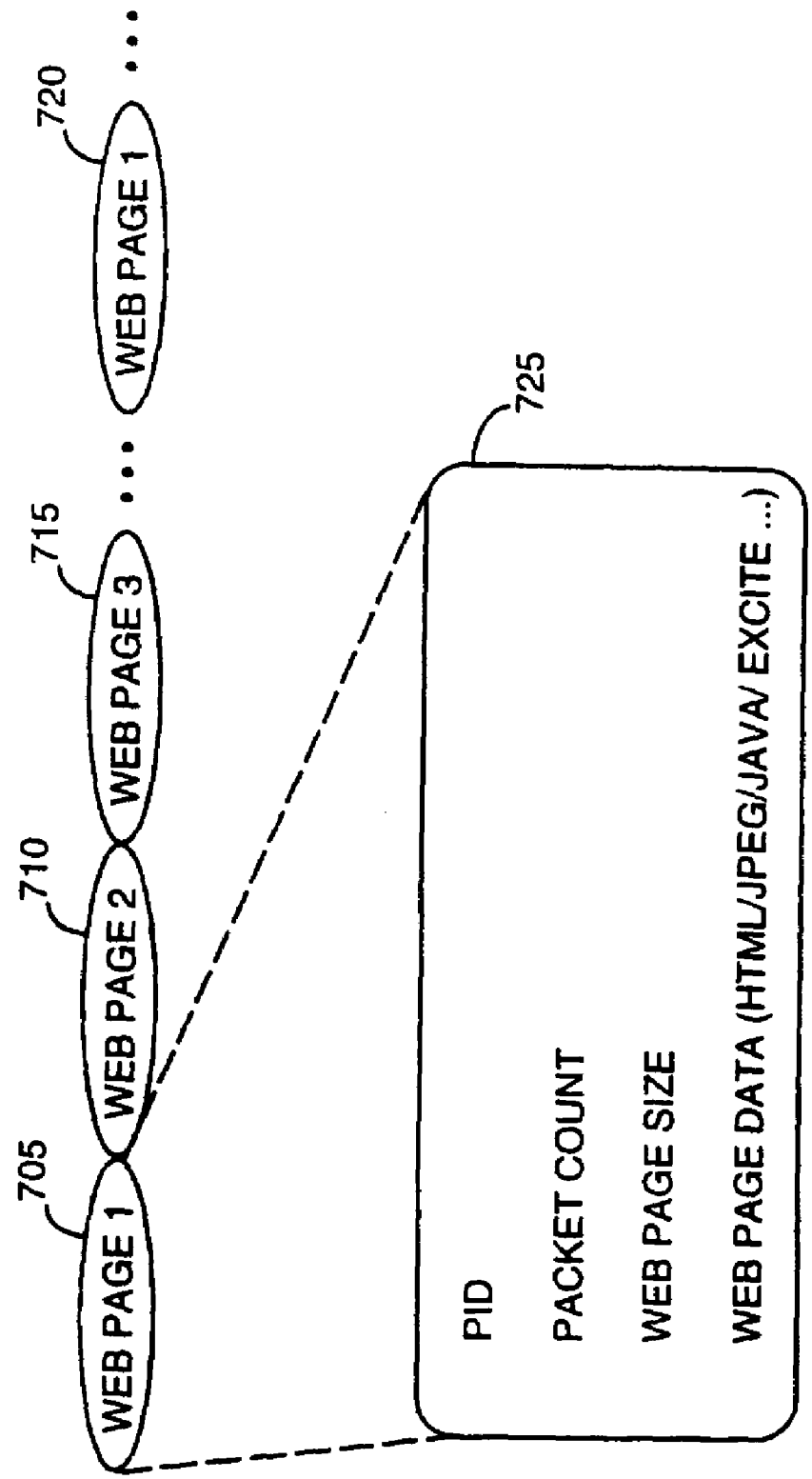
FIG. 3 shows a data format, according to the invention, for packetizing Internet data for transmission within an MPEG compatible datastream.

The web page information, encoded in HTML™ and Java™, is packetized and formatted in an encoder by the service provider for incorporation into the MPEG transport datastream for transmission. FIG. 3 shows a data format, according to the invention, for packetizing Internet data for transmission within an MPEG compatible datastream. A sequence of HTML™/Java™ web pages (705-720 of FIG. 3) is formed by the encoder into non-compressed packets with ancillary information and HTML™/Java™ data (725). The ancillary information includes PID values, a packet count value, and individual web page size (e.g. number of bytes or image pixel size). The ancillary information may also include: a flag to indicate that a particular transport packet contains web page information; a start code; a web page identification code; an error correction code and a timing parameter suitable for synchronizing web page Internet information with an associated video or audio program. The web page flag may be used to facilitate identification and separation of the web page information from the MPEG compressed video data. Further, one or more elements of the web page ancillary data may be included within User definable elements of the MPEG transport syntax, such as within the transport header, or it may be included along with the web page information in the MPEG transport data payload.

The response web page information, including a predetermined PID value, is incorporated in the MPEG compatible transport datastream input to processor 25 (FIG. 1) by the service provider. The response channel predetermined PID value is also prestored in controller 115 internal memory and incorporated in the composite program map information. As an alternative, the response data PID value and associated program map data may be encoded, for example, in a Channel Information Table (CIT) in a high definition television (HDTV) signal encoded according to the Digital Television Standard for HDTV Transmission of Apr. 12, 1995, prepared by the United States Advanced Television Systems Committee (ATSC). In such a case, one or more specific pre-determined program channels may be designated to convey web page response information. Further, the PID values of the program channels may be conveyed in a CIT in the composite program map information, for example.

Controller 115 derives the predetermined PID value corresponding to the requested web page response information from the stored composite program map information and loads it into control registers within unit 45. Unit 45 matches the PIDs of incoming packets of web page response data in the transport datastream from decoder 30 with the PID value pre-loaded in the unit 45 control registers. The packets with PID values matching the pre-determined web response PID value are identified as web page response data and are provided by unit 45 to a dedicated buffer in decoder 55. The dedicated buffer in transport decoder 55 holds response data to be decoded by processor 60.

Processor 55 derives system information including timing, error and synchronization information from the datastream from unit 45 and provides it to controller 115. Controller 115 applies the system information in directing processor 55 to provide re-synchronized web page response data from the dedicated buffer in decoder 55 to HTML™/Java™ processor 60. Processor 60 decodes the HTML™ and Java™ encoded web response information and provides web page image representative pixel data for storage in memory within controller 115. Although processor 60 is shown as a separate processor in FIG. 1, it may also be implemented within the software of controller 115. Processor 60 comprises the processing functions of a special web browser, including JPEG decompression and Java decoding such as involved in the operation of Netscape Navigator™, for example.

Program content data e.g. a User selected television program channel, within the MPEG compatible transport datastream from decoder 30, is also decoded into pixel representative data by processor 25 in addition to the web page response data. For this purpose, controller 115 determines the PID value of the selected television channel program from the composite program map information and loads it into control registers within unit 45. Unit 45 matches the PIDs of incoming packets of selected television channel program data in the transport datastream from decoder 30 with the PID value pre-loaded in the unit 45 control registers. The packets with PID values matching the pre-determined selected television channel program PID value are identified and provided by unit 45 to a dedicated application buffer in decoder 55.

As previously described for the web page response data, processor 55 derives system information including timing, error and synchronization information from the datastream from unit 45 and provides it to controller 115. Controller 115 applies the system information in directing processor 55 to provide re-synchronized program channel content data from the application buffer in decoder 55 to MPEG decoder 65. The MPEG compatible program channel content data is decompressed by MPEG decoder 65 to provide video pixel data and audio output data to display processor 70. The video pixel data from decoder 65 is stored in a pixel representative memory contained in display processor 70.

Controller 115 retrieves the web page image pixel data from internal memory and formats it for storage as an overlay in the pixel representative memory contained in display processor 70. As such a merged display combining the web page response data and program channel content is formed within the pixel memory of processor 70. The relative proportions and sizes of the web page image and channel content image within the resultant composite image, formed in the processor 70 pixel memory, may be varied by controller 115 in response to internal programmed instruction or external, e.g. User, command. The relative proportions may be varied so that either the web page image or channel content image contributes between 0-100% of the resultant composite image.

In order to adjust the proportion of the composite image contributed by the web page data, controller 115 scales the web page image pixel data by a conventional interpolation process. Alternatively, the data may be scaled by a separate video processing integrated circuit operating in conjunction with controller 115. The resulting scaled web page image is stored within the processor 70 pixel memory by controller 115. The stored web page image represents an overlay image with respect to the program channel content image. In order to adjust the location of the web page image data within the composite image, controller 115 determines the addresses corresponding to the desired memory locations from internal memory map data and stores the scaled web page image data at the desired memory locations. As previously explained, display processor 70 converts the formatted composite image data into conventional luminance and chrominance components. Further, processor 70 processes the luminance and chrominance components, together with timing data provided by controller 115, in a conventional manner to form an NTSC signal for display on NTSC compatible image reproduction device 75.

Second configuration of Processor 25

In the second configuration, processor 25 of FIG. 1 acquires web page data that is transmitted in the satellite broadcast received from decoder 30 in response to an information request to a service provider via a telephone line.

Upon a User requesting web page data, e.g. by highlighting web page icon 857 in FIG. 2, controller 115 (FIG. 1) uses the request access data (telephone number, requested web page identifier code (e.g. URL) and conditional access data) to establish communication with the satellite broadcast service provider.

Prior to establishing communication with the service provider, controller 115 determines from conditional access information whether access to the requested web page information is authorized. Authorization may be determined directly from the program guide conditional access information or indirectly from a User entitlement device such as a smart card (not shown to simplify the drawing) within processor 25. If access is authorized, controller 115 establishes telephone communication with the satellite broadcast service provider by dialing a telephone number via modem 80 and transmitting request information e.g. requested web page identifier code (such as a URL) and user entitlement code. The service provider incorporates the requested web page information in the transport datastream transmitted to processor 25 via antenna 10, processor 20 and decoder 30. Controller 115 uses the response access data (PIDs of the web page data, response program channel number and transponder number) to identify and assemble the web page packets in the transport stream as described for the first configuration of processor 25.

The PID values of the response web page information and corresponding program map information may be communicated between service provider and processor 25 in a variety of ways and in a variety of data formats. The PID values and program map information may be conveyed, for example, in accordance with proprietary or custom requirements of a particular system such as within MPEG user definable data elements or within non-MPEG data such as within the vertical blanking interval (overscan region) of a broadcast television signal. Further, the PID values allotted to the web information may also be transmitted to processor 25 in supplemental program guide information. As another alternative, the PID values to be used for response data may be determined by a service provider from information transmitted from processor 25.

Third configuration of Processor 25

In a third configuration, processor 25 both requests information and receives response information on the same communication link e.g. on the telephone link to server 83 or connection service 87, via modem 80. In this configuration, controller 115 requests Internet web page information by highlighting icon 857 (FIG. 2), for example. Whereupon controller 115 (FIG. 1) uses request access data (telephone number and URL code and conditional access data) to establish Internet access and request web page data at the URL address via modem 80 and server 83. Controller 115 determines whether the requested Internet access is authorized from conditional access or smart card User entitlement information as described in connection with the second configuration of processor 25. If authorized, controller 115 establishes telephone communication with a service provider via server 83 by dialing a telephone number using modem 80 and transmitting the Internet URL address code and user entitlement code, for example, as previously described. Controller 115 uses response access data (including Transmission Control Protocol/Internet Protocol (TCP/IP) identification data) determined from the composite program map information to identify and assemble the web page TCP/IP packets containing the web page HTML and associated JAVA data (and other data e.g. JPEG, GIF, TIF type data) in the response datastream from server 83.

The response web page TCP/IP packets are buffered within modem 80 and provided to HTML™ processor 60 under command of controller 115. Processor 60 decodes the HTML™ and Java™ encoded web response information and provides web page image representative pixel data for storage in memory within controller 115. Controller 115 retrieves the web page image pixel data from internal memory and formats it for storage as an overlay in the pixel representative memory contained in display processor 70 for reproduction by unit 75 as a merged display, as previously described. In this configuration, processor 25 supports full Internet access via server 83 using the displayed program guide. For example, upon a User highlighting icon 810 followed by icon 830 (FIG. 2) controller 115 (FIG. 1) executes web page browser functions and displays either a custom web page browser or a standard browser display such as Netscape Navigator™ through which full Internet access is available.

Alternatively, in the third configuration, processor 25 may support a limited Internet service. In this case, access to the Internet network via server 83 is under the control of a service provider that allows only indirect Internet access. The service provider provides collated web page information for display compatible with the displayed composite program guide. The service provider stores a limited number of web pages locally within server 83 that are accessible by processor 25 using the composite program map information which provides an index to the available web pages and their corresponding predetermined PIDs. Alternatively, the service provider may alter the selection of web pages available from server 83 and periodically provide updated compatible supplemental program guide information to processor 25 via the satellite broadcast datastream.

The supplemental program guide information enables processor 25 to form an updated displayed guide together with compatible program map and other access information enabling a User to access the updated web information. By storing the web page Internet information locally in server 83 the service provider retains control of the Internet content available to a User and is able to bill the User for the material provided. Also, the local storage of the web page information in server 83 provides a User with faster access to the information without the full delay associated with normal Internet access. Further, the burden on processor 25 of communicating information requests to external devices is minimized in that only a limited quantity of Internet information may be requested and processor 25 need only communicate with local servers such as server 83. It is to be noted that modem 80 may also be a wide bandwidth communication modem such as a cable modem. In which case, processor 25 may decode both web page data and broadcast video program data for display from a cable program source via modem 80.

Figure 4:
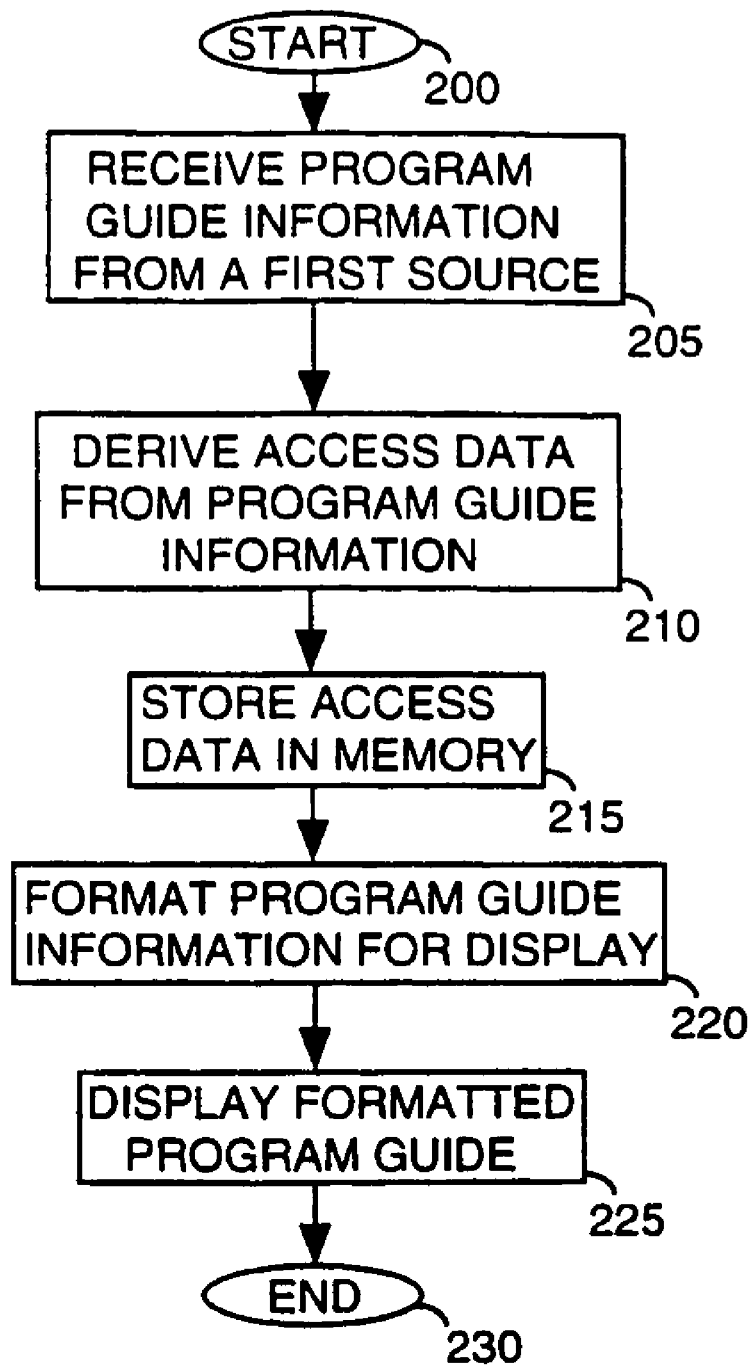
FIG. 4 shows a flowchart, according to the invention, for receiving program guide information including User selection options and processing the received information to form a program guide supporting User selectable communication functions.

Controller 115 employs the method shown in FIG. 4 to produce a displayed program guide by processing and formatting received program guide information that already includes User selection menu options. The process of FIG. 4 does not require processor 25 to form User selection menu options and may be employed by processor 25 in its first configuration, for example. In step 205, following the start at step 200, processor 25 receives a transport datastream from decoder 30 that incorporates User selectable menu options for display as part of the displayed program guide. The User selectable options support User initiation of communication functions such as Email, telephone, Internet access, fax, video-phone, channel tuning, program recording and home control functions.

The data received in step 205 also includes additional linking data in the program guide information. The additional linking data comprises program map, conditional access and network information and associates access data with the User selectable menu options in the displayed program guide. The access data includes, identification codes, communication protocol codes, conditional access codes, Internet access codes e.g. URL codes for web page and Email access as well as telephone and fax numbers. The additional linking data enables processor 25 to assemble, decode and display the program content and program guide information in the transport stream from decoder 30. The access data enables processor 25 to communicate with external devices and includes different address representative codes corresponding to addresses of different information sources. In step 210, controller 115 uses predetermined linking data PID values stored in internal memory in directing processor 25 to identify and capture the linking and access data from the received program guide information. The captured linking data is assembled, formatted and stored by controller 115 in internal memory in step 215. Also, in step 210, additional linking data such as Internet or Email addresses or telephone numbers may be entered by a User via an entry device such as a remote control unit and the additional data is incorporated in the received linking data by controller 115.

The program guide information containing the User selectable options, is formatted for display by controller 115 in conjunction with display processor 70 within processor 25 in step 220, as previously described in connection with FIG. 1. In step 225, display processor 70 converts the stored and formatted program guide data into conventional luminance and chrominance components. The luminance and chrominance components, together with timing data provided by controller 115, are processed by processor 70 for display on reproduction device 75. The process of FIG. 4 terminates at step 230.

Figure 5:
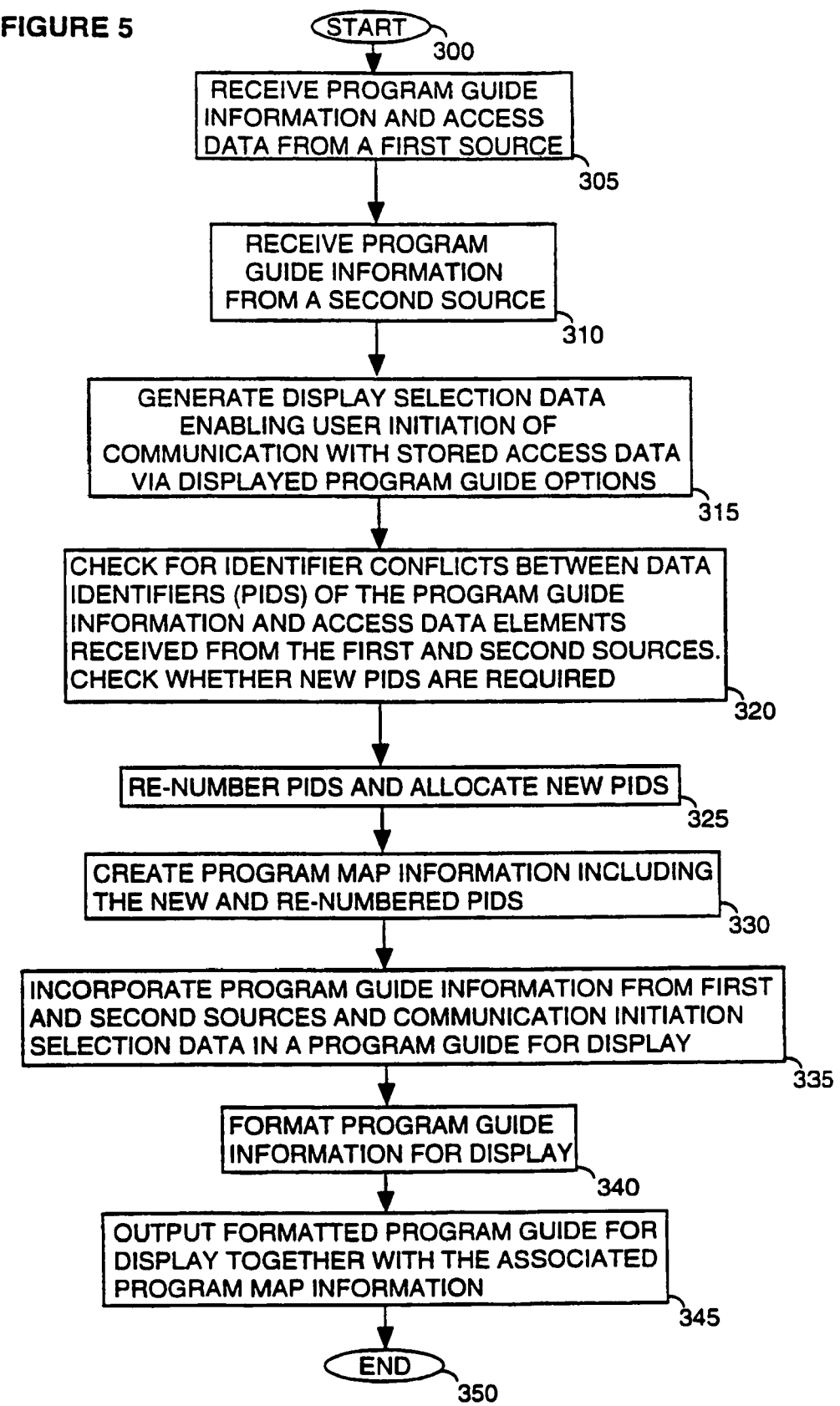
FIG. 5 shows a flowchart, according to the invention, for a process to form a program guide in a video decoder from information received from a plurality of sources.

Controller 115 (FIG. 1) employs the method shown in FIG. 5 to produce a program guide in a video decoder from information received from a plurality of sources. The formed guide supports User selectable communication functions e.g. Internet access, Email, fax etc. In step 305, following the start at step 300, controller 115 acquires satellite program guide (SPG) information from the satellite broadcast transport stream received by processor 25 from decoder 30. In step 310, controller 115 acquires DVD program guide (DPG) information from storage device 90 via interface 95. Controller 115 acquires, collates and formats the SPG and DPG by accessing and assembling respective data packets to produce SPG and DPG representative pixel data for storage as a composite program guide in the unit 70 pixel map, as previously described in connection with FIG. 1. The SPG and DPG information includes linking and access data in the form of program map, conditional access and network information. In other configurations, processor 25 applies the principles detailed herein to form a composite program guide including program guide information derived from a source such as a terrestrial broadcast source, a cable broadcast source, a computer source, a radio transmission source and a source accessed via telephone lines.

In step 315, controller 115 creates User selectable menu options for display (for User selection of Internet access, Email, fax etc.) in pixel data form for incorporation in the unit 70 pixel memory map. In step 315, controller 115 also creates User determinable menu options that enable a User to customize his program guide to include an icon that performs a specific User requested function, for example, a User may require an icon that accesses a specific Internet site or results in a display of all received messages. Controller 115 responds to commands entered via a data entry device e.g. a remote control unit or keyboard in creating the User determinable menu option in accordance with programmed instructions.

Controller 115, in step 320, examines the SPG and DPG information for data identifier (e.g. PID) omissions and conflicts. In step 325, controller 115 re-numbers existing data identifiers and allocates new data identifiers as required to produce compatible program map information for both the collated program guide information and the associated program content. In step 330, controller 115 forms composite program map, conditional access and network information for the composite program guide in the manner described in connection with FIG. 1.

The composite program map is formed to enable processor 25 to perform the communication functions selectable via the composite program guide. For this purpose, the composite program map associates a communication function PID and menu option (e.g. web page, Email, fax icon) with the different address representative codes corresponding to the addresses of the different information sources. In step 330, controller 115 also incorporates User entered data into the composite program map, conditional access and network information. This data may include items such as an Email address, a telephone/fax number, an Internet web page link address, a credit card number etc. The User enters this data to processor 25 via a device such as a remote control or keyboard. Controller 115, in step 335, formats the SPG and DPG pixel data together with the menu option pixel data in the unit 70 pixel map created in step 315 to form a composite program guide for display.

The composite program guide information containing the User selectable menu options is formatted for display in step 340, and output in step 345 as previously described in connection with FIG. 1. The process of FIG. 5 terminates at step 350.

Figure 6:
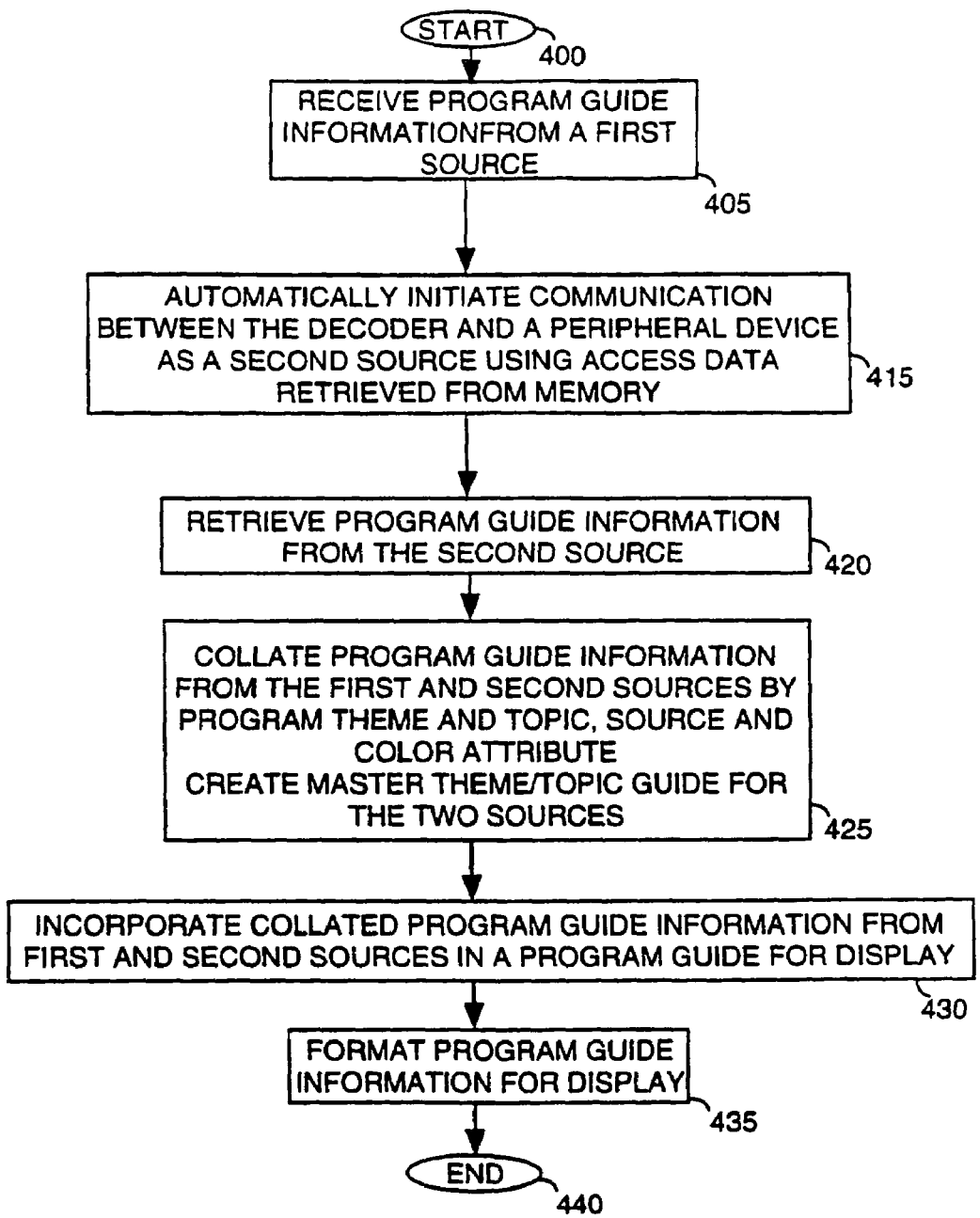
FIG. 6 shows a flowchart, according to the invention, for a process to automatically acquire and collate program guide information from a plurality of sources and to form a program guide for display.

Controller 115 (FIG. 1) employs the process of FIG. 6 to automatically acquire and collate program guide information from a plurality of sources to form a composite program guide for display. In step 405, following the start at step 400, controller 115 acquires and stores satellite program guide (SPG) information from the satellite broadcast transport stream received by processor 25 from decoder 30. Controller 115, in step 415, automatically initiates communication with DVD storage device 90 (FIG. 1), via interface 95. The communication is initiated upon power-up of processor 25 in response to pre-stored hardware configuration information defining the peripheral devices that are attached to processor. 25 and the associated communication protocols. This information may be contained within the received program guide information, or may be stored within processor 25 at manufacture, or may be determined locally by processor 25 or may be determined through a combination of these methods. The local determination of hardware configuration by processor 25 may be accomplished either by peripheral interrogation initiated by controller 115, or by User data entry of hardware configuration data.

In alternative embodiments, communication may be automatically initiated upon conditions such as, a) User command via a program guide option selection, for example, b) peripheral interrogation initiated by controller 115 on a periodic or intermittent basis, or c) detection of a new or changed electrical connection of processor 25 to a peripheral device such as DVD device 90.

Controller 115 initiates communication with DVD unit 90 via interface 95 using communication protocol codes, identification codes, entitlement codes and conditional access codes retrieved from the access data within the received program guide information. In step 420, controller 115 directs processor 25 to acquire and assemble the DVD program guide (DPG) information derived from DVD storage device 90 via interface 95 in the manner previously described in connection with FIG. 1. In step 425, controller 115 collates the SPG and DPG information by theme and topic by mapping the SPG and DPG information to corresponding theme and topic categories in a master set, also as described in connection with FIG. 1. Further, in step 425, controller 115 collates the SPG and DPG information by source and allocates a different color attribute to programs and program icons from different sources. In addition, controller 115 creates menu options permitting a User to sort by source and color.

Figure 7:
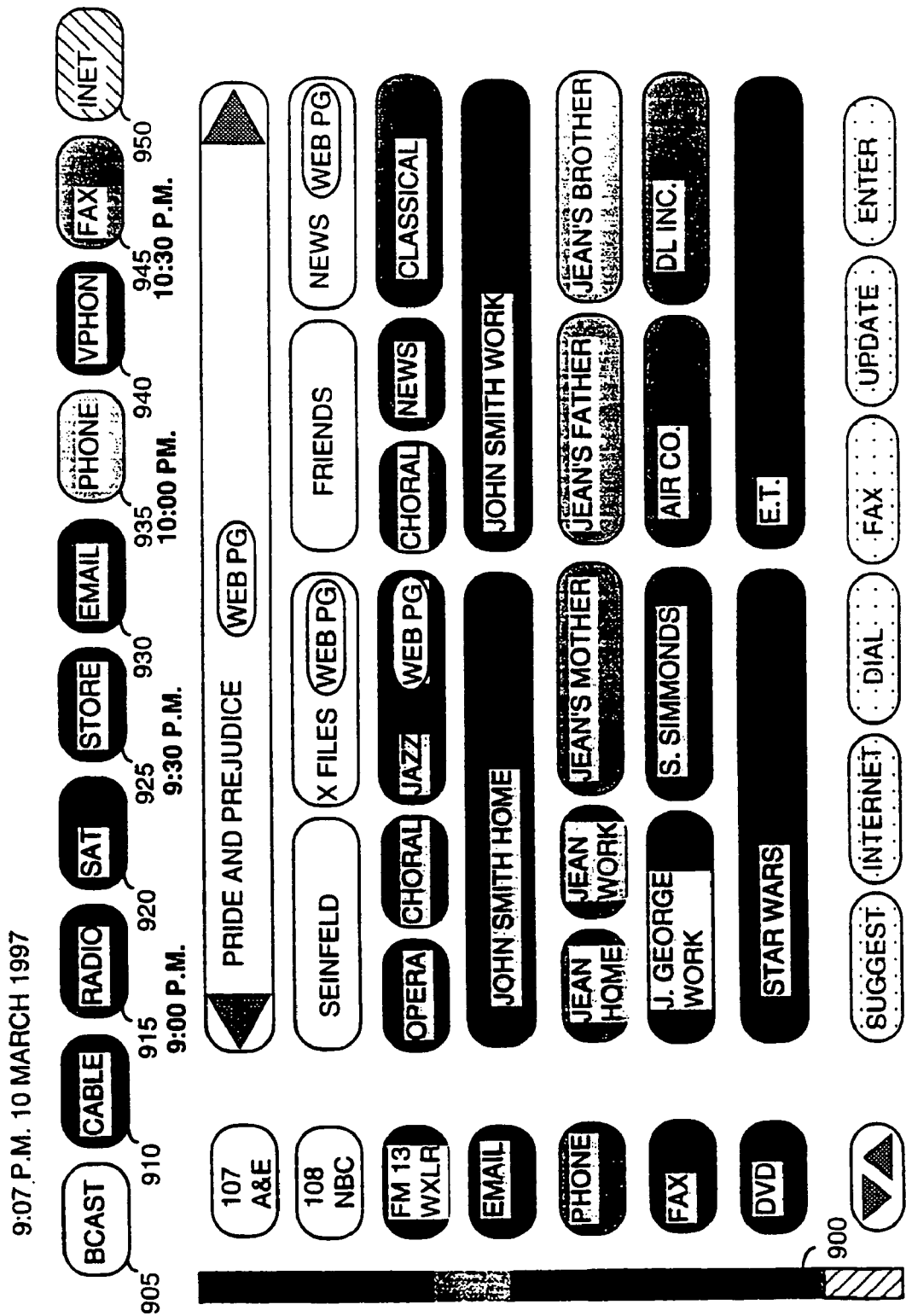
FIG. 7 shows a black and white representation of an exemplary color Program Guide display format, according to the invention, showing menu options permitting a User to collate programs by source and color attribute.

FIG. 7 shows a black and white representation of a color Program Guide display format, according to the invention, showing menu options created by controller 115 permitting a User to collate programs by source and color attribute. Source icons 905-925 are associated with off-air broadcast, cable, radio, satellite and storage (e.g. DVD source 90—FIG. 1)

respectively. Source icons 930-950 are associated with Email, telephone, videophone, fax and Internet function sources respectively. Upon a User highlighting source icon 905, for example, a program guide is displayed showing off-air broadcast programs and associated icons. Similarly, upon a User highlighting source icon 930, for example, a program guide is displayed showing Email icons via which a User may activate menus for initiating composition and sending of Email messages and reading and deleting of messages received.

Icon 900 is a "rainbow" sort icon showing a spectrum of discrete color blocks represented by shades of gray in the black and white program guide depiction of FIG. 7. The color choices of icon 900 may alternatively be arranged as a continuous color spectrum or selected range of colors in a single or a number of discrete color blocks. Upon a user highlighting a particular color within icon 900, programs from the source attributed with that particular color are displayed. For example, assuming in step 425 controller 115 attributes the color purple to the DVD source device 90, then upon a user highlighting the color purple within icon 900, the movies available from DVD device 90 become displayed as a program guide. Alternatively, the color collation scheme may be used to identify programs by other criteria than source. Color may be used as an attribute to identify programs by theme or topic, for example, in which case a display of movies available for viewing from all sources may be identified by highlighting a red color within icon 900, for example. In addition, program guide data may be collated by attributes other than color. For example, programs from different sources may be attributed with different types of shading or different icon shapes and geometrys.

Continuing with the process of FIG. 6, in step 430, controller 115 forms a composite program guide for display from the collated SPG and DPG information in a manner similar to that described in connection with FIG. 1. Controller 115 also, in step 425, creates associated User selectable menu options for display including the User selectable program guide options for sorting by source and color. The created menu options are incorporated by controller 115 in step 430 in a composite program guide for display as exemplified in FIG. 7. In step 435, controller 115 formats the composite program guide information for display as previously described in connection with FIG. 1. The process of FIG. 6 terminates at step 440.

Controller 115 (FIG. 1) employs the process of FIG. 8 to acquire web page information requested by a video receiver User via a selection made from options on a displayed program guide. In step 505, following the start at step 500, controller 115 retrieves access data in the form of a telephone number and Internet URL code, for example, from memory in response to a User selection of a web page made via a displayed program guide. The access data associated with the particular User selection is determined from a program guide database using program map information that links all data associated with a particular program or program guide function.

In step 515, controller 115 directs processor 25 to establish a request communication link with server 83 by dialing the retrieved telephone number using modem 80. Also, in step 515, processor 25 encodes and transmits additional access data such as the Internet URL code using the protocol required for communication on the request communication link. The required protocol is determined from the program map information. In step 520, controller 115 directs processor 25 to receive and decode an input signal received on a response communication link. Controller 115 directs processor 25 in identifying and retrieving the response web page information from the input signal in steps 525 and 530. Different methods of retrieving response data from the input signal are employed by processor 25 in steps 525 and 530. The selected method depends on whether or not the response communication link is the same link used for the web page data request. The methods used in identifying and retrieving the response data are similar to those previously described in connection with the three configurations of processor 25. Controller 115 applies the appropriate configuration method in identifying the response web page data in the input signal, in step 525. For this purpose, controller 115 uses data identifiers determined from program map information that associates the identifiers with the User program guide selection. Controller 115, in step 535, formats the response web page information for display and the FIG. 8 process ends at step 540.

Controller 115 (FIG. 1) employs the process of FIG. 9 for decoding both input Internet information and compressed video data to form a composite video output for display. Following the start at step 600, controller 115, in step 605, determines packet identifiers for User requested Internet data and compressed image data from program map information. In step 607, controller 115 determines whether access to the compressed video data and the requested Internet data is authorized from conditional access or smart card User entitlement information as previously described in connection with the third configuration of processor 25.

If access is authorized, controller 115, in step 610, identifies the web page TCP/IP packets containing the web page data in a response datastream from server 83. Similarly, if access is authorized, controller 115, in step 615, identifies the compressed video data packets containing a User selected video program in an input transport stream from decoder 30 to processor 25. Controller 115 identifies the web page and compressed video data packets in a similar manner to that described in connection with FIG. 1.

In step 617, controller 115 directs processor 25 (FIG. 1) to decrypt Internet or compressed video data if it is encrypted. Controller 115 in step 620, directs processor 25 in decoding the identified Internet web page data using HTML™ processor 60. Controller 115 in step 625, directs processor 25 in decompressing the identified compressed video data using MPEG decoder 65. The resultant decoded web page data and decompressed video data is merged, formatted and displayed on unit 75 using display processor 70 under the direction of controller 115 in step 630. The process of FIG. 9 terminates at step 640.

The architecture of FIG. 1 is not exclusive. Other architectures may be derived in accordance with the principles of the invention to accomplish the same objectives. Further, the functions of the elements of processor 25 of FIG. 1 and the process steps of FIGS. 4-6, 8 and 9 may be implemented in whole or in part within the programmed instructions of a microprocessor. In addition, the principles of the invention apply to any form of MPEG or non-MPEG compatible electronic program guide. Further, the principles of the invention apply to communication on any form of communication link including via cable, infra-red, radio, microwave, and via a computer network. In addition, it is to be noted that the formation of the composite program guide as described herein may be performed at a location remote from a video receiver and accessed by the receiver via a communication network.

The invention claimed is:

1. In a video decoder system for receiving program guide information from a first source, a method for forming a composite program guide for program content available from a plurality of sources, comprising the steps of:

a) retrieving access data from memory;

b) initiating communication automatically between said decoder and a second source external to said video decoder using said access data; said communication being initiated by said decoder independently of a user command associated with a program or service selection, wherein said second source is a peripheral device coupled to said video decoder;

said second source stores programming content and program information related to said program content available from said peripheral device c) retrieving said program information from said second source; and d) incorporating said program information provided by said first and second sources into a program guide for display.

2. A method according to claim 1 wherein, in step (b) said communication is initiated in response to at least one of: a) power-up of said decoder, and b) power-up of said peripheral device.

3. A method according to claim 1 further including the step of detecting a change in number or type of peripheral devices connected to said decoder.

4. A method according to claim 3 wherein said change is detected in response to configuration data identifying said peripheral device attached to said decoder and provided from received program guide information.

5. A method according to claim 1 wherein said step of initiating communication is performed in response to pre-stored configuration data identifying said peripheral device attached to said decoder.

6. A method according to claim 1 wherein said first source is one of a) a satellite broadcast source, b) a terrestrial broadcast source, and c) a cable broadcast source, and said second source is one of a) a storage source, b) a digital versatile disc (DVD) player, and c) a server.

7. In a video decoder system for receiving program guide information from a first source, a method for forming a program guide for program content available from a plurality of sources, comprising the steps of:

a) automatically identifying a peripheral device attached to said decoder, said identification being initiated by said decoder independently of a user command associated with a program or service selection;

b) initiating communication between said decoder and said peripheral device attached to said decoder, wherein said peripheral device stores programming content and program information related to said program content available from said peripheral device;

c) retrieving said program information stored in said peripheral device; and d) incorporating said program information provided by said first source and peripheral device into a program guide for display.

8. A method according to claim 7 wherein, in step (a)

said peripheral device is identified from configuration information derived from one of: a) pre-stored data in internal memory of said decoder, b) data entered by a User, and c) said program guide information received from said first source.

9. A method according to claim 7 further including the step of polling via a decoder communication link to determine whether said peripheral device is attached to said decoder link.

10. A method according to claim 7 further including the step of identifying a change in number or type of peripheral devices connected to said decoder.

11. A method according to claim 10 wherein in step (c)

said communication is initiated in response to said change.

12. A method according to claim 7 wherein said peripheral device is one of a) a storage device, b) a DVD player, and c) a server.

13. In a video decoder system for receiving program guide information from a first source, a method for forming a program guide for program content available from a plurality of sources, comprising the steps of:

a) automatically initiating communication between said decoder and a peripheral device attached to said decoder in response to at least one of the following conditions: i) power-up of said decoder, ii) power-up of said attached peripheral device, iii) repetitive pre-programmed command from a decoder processor, iv) change in number of attached peripheral devices, and v) change in type of attached peripheral devices;

b) retrieving program information from said peripheral device, wherein said peripheral device stores programming content and program information related to said program content available from said peripheral device; and c) incorporating said program guide information provided by said first source and peripheral device into a program guide for display, wherein said first source is accessed via the Internet using access data.

14. A method according to claim 13 wherein said access data comprises a uniform resource locator.

15. The method of claim 1 comprising an additional step of:

e) requesting said stored programming content from said peripheral device in response to selecting an entry that corresponds to said programming content displayed in said program guide.

16. The method of claim 15, comprising an additional step of:

f) decoding said programming content that is received from said peripheral device that was requested in step e.

17. The method of claim 7 comprising an additional step of:

e) requesting said stored programming content from said peripheral device in response to selecting an entry that corresponds to said programming content displayed in said program guide.

18. The method of claim 17, comprising an additional step of:

f) decoding said programming content that is received from said peripheral device that was requested in step e.

19. The method of claim 13 comprising an additional step of:

d) requesting said stored programming content from said peripheral device in response to selecting an entry that corresponds to said programming content displayed in said program guide.

20. The method of claim 19, comprising an additional step of:

e) decoding said programming content that is received from said peripheral device that was requested in step e.

* * * * *